United States Patent
Hamada et al.

(10) Patent No.: US 8,461,367 B2
(45) Date of Patent: Jun. 11, 2013

(54) PREPARATION PROCESS OF TRISILYLAMINE

(75) Inventors: Yoshitaka Hamada, Joetsu (JP); Kazuhiro Hirahara, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 65 days.

(21) Appl. No.: 13/004,377

(22) Filed: Jan. 11, 2011

(65) Prior Publication Data

US 2011/0178322 A1    Jul. 21, 2011

(30) Foreign Application Priority Data

Jan. 15, 2010   (JP) ................................. 2010-006891

(51) Int. Cl.
*C07F 7/02*   (2006.01)
(52) U.S. Cl.
USPC ........................................................ 556/412
(58) Field of Classification Search
None
See application file for complete search history.

(56) References Cited

U.S. PATENT DOCUMENTS

| | | | |
|---|---|---|---|
| 4,200,666 A * | 4/1980 | Reinberg | 427/579 |
| 4,595,775 A * | 6/1986 | Arkles | 556/409 |
| 4,886,860 A * | 12/1989 | Arai et al. | 525/474 |
| 2005/0196970 A1 | 9/2005 | Misra et al. | |
| 2006/0084281 A1 | 4/2006 | Misra et al. | |
| 2007/0190807 A1 | 8/2007 | Misra et al. | |

FOREIGN PATENT DOCUMENTS

| | | |
|---|---|---|
| JP | 60-257824 A | 12/1985 |
| JP | 2006-016641 A | 1/2006 |

OTHER PUBLICATIONS

Sujishi, Sei, et al., "Effect of Replacement of Carbon by Silicon in Trimethylamine on the Stabilities of the Trimethylboron Addition Compounds. Estimation of the Resonance Energy for Silicon-Nitrogen Partial Double Bond", Journal of the American Chemical Society, Sep. 20, 1954, 76, 4631-4636.

* cited by examiner

*Primary Examiner* — Sudhakar Katakam
(74) *Attorney, Agent, or Firm* — Winstead PC

(57) ABSTRACT

Provided is a preparation process of trisilylamine capable of preparing high-purity trisilylamine more easily at a lower cost. More specifically, provided is a preparation process of trisilylamine, comprising a step of thermally decomposing perhydropolysilazane under an oxygen-free or low oxygen atmosphere.

4 Claims, No Drawings

PREPARATION PROCESS OF TRISILYLAMINE

CROSS-RELATED APPLICATIONS

This application claims priority from Japanese Patent Application No. 2010-006891; filed Jan. 15, 2010, the disclosure of which is incorporated herein by reference in its entirety.

BACKGROUND OF THE INVENTION

1. Field of the Invention

The present invention relates to a preparation process of trisilylamine ($N(SiH_3)_3$).

2. Description of the Related Art

Trisilylamine (which may hereinafter be abbreviated as "TSA") is known as a compound useful as a silicon source in film formation using CVD. For example, it is reported in U.S. Pat. No. 4,200,666 that a high film formation rate and high film uniformity can be achieved by using TSA for the formation of a silicon nitride film. It is also reported in JP 2006-16641A that by using TSA as a silicon source for the formation of a silicon oxynitride film comprising a high-dielectric-constant metal, a carbon impurity level can be lowered and the metal content can be controlled more easily compared with film formation using silane and an organic amide compound.

In a general synthesis process, TSA is obtained from monochlorosilane and ammonia. Monochlorosilane is obtained as a trace by-product of the synthesis of dichlorosilane or trichlorosilane and it is not mass-produced as an intended product. In addition, similar to monosilane, it is difficult to treat monochlorosilane safely so that according to many conventional reports, TSA is synthesized from monobromosilane (for example, *Journal of the American Chemical Society*, 76, 4631-4636(1954)).

SUMMARY OF THE INVENTION

As described above, synthesis of TSA in accordance with the conventional process requires special raw materials or includes a reaction using a dangerous gas as a raw material, which interferes with industrialization of it. In addition, since a byproduct ammonium chloride is a sublimable solid, TSA cannot be separated and purified easily. In particular, chlorine-free products, that is, products satisfying an important factor as a film-forming material, cannot be obtained easily. The present invention provides a preparation process of TSA capable of yielding high-purity TSA more easily at a lower cost.

As a result of the present inventors' extensive investigation, it has been found that TSA can be obtained easily by thermal decomposition of perhydropolysilazane under an atmosphere from which oxygen is blocked, leading to the completion of the present invention. The perhydropolysilazane has been known as a material sintered under an oxygen atmosphere for the formation of a silicon oxide film.

Accordingly, the present invention provides a preparation process of trisilylamine comprising a step of thermally decomposing perhydropolysilazane under an oxygen-free or low-oxygen atmosphere.

Perhydropolysilazane is usually prepared from dichlorosilane and ammonia which are mass-produced materials, and can have a purity as high as that of materials suited for use as electronic materials. Accordingly, it is relatively inexpensive and can be treated safely. TSA can be obtained by the thermal decomposition reaction of it. Accordingly, the present invention can provide a preparation process of TSA capable of yielding high-purity TSA easily at a low cost. Furthermore, the preparation process of TSA according to the present invention facilitates separation and purification of TSA from the reaction mixture produced in the process.

DETAILED DESCRIPTION OF THE PREFERRED EMBODIMENTS

The embodiments of the present invention will hereinafter be described specifically. The invention is, however, not limited to or by these embodiments.

Perhydropolysilazane, a raw material of TSA, is an inorganic polymer composed only of silicons, nitrogens, and hydrogens, and it has, on each of the side chains thereof, hydrogens. It may have any of linear, partially branched linear, branched, and reticular structures. Perhydropolysilazane is usually prepared from dichlorosilane and ammonia which are available in large amounts (see, for example, JP 60-257824/1985A). High-purity perhydropolysilazane is commercially available as an electronic material in the form of a xylene, dibutyl ether, or hydrocarbon solution, which can be used as a raw material for the preparation process of TSA according to the present invention. The solvent of the TSA solution preferably has a boiling point widely different from that of TSA in view of separation. When the solvent is present during thermal decomposition of perhydropolysilazane, the solvent not decomposing at the decomposition temperature of perhydropolysilazane is preferred. Preferred examples of the solvent include toluene, xylene, dibutyl ether and isooctane. Although the molecular weight of perhydropolysilazane is not particularly limited, it has preferably a weight-average molecular weight of from 200 to 10,000 as measured by gel permeation chromatography (GPC) from the standpoint of volatility, solubility, and solution viscosity. The commercially available solution of perhydropolysilazane has usually a concentration of 5 to 25 wt % and may be used as it is or after it is concentrated. The concentration is preferably from 15 to 50 wt % from the standpoint of batch yield and solution viscosity.

Thermal decomposition is conducted under an oxygen-free or low-oxygen atmosphere, for example, under reduced pressure or a gas atmosphere inert to TSA and perhydropolysilazane. The oxygen-free or low oxygen atmosphere is preferably an atmosphere having an oxygen concentration not greater than 100 ppm (including an oxygen concentration of 0). The term "reduced pressure" includes a pressure of preferably from 0.01 to 0.9 atm from the standpoint of eliminating oxygen. Examples of the inert gas include so-called reducing gases and noble gases such as hydrogen, nitrogen, helium, neon and argon. When TSA obtained by the process of the present invention is used for CVD, it is preferred to use hydrogen or a mixture of a hydrogen gas and a noble gas such as a mixture of hydrogen and helium or a mixture of hydrogen and argon so that gas exchange can be omitted during filling of the product or the like. The TSA recovered after purification can be used as it is as a raw material gas for CVD reaction in the reaction system that uses a single gas or mixed gas selected from a hydrogen gas and/or noble gases as the atmospheric gas.

In the thermal decomposition of perhydropolysilazane into TSA, an effective reaction rate can be achieved without using any particular catalyst preferably at a temperature of 300° C. or greater but not greater than 600° C. Heating at the temperature more than 600° C. may be unnecessary in consideration of the safety of an apparatus used for the reaction. The thermal decomposition without a catalyst needs a high temperature such as 300° C. or greater but is advantageous because it can prevent impurity incorporation. Below a temperature of 300° C., decomposition of perhydropolysilazane generates different products, such as $SiH_4$ and others. TSA may decompose when heated to temperatures exceeding 600° C. Thus, the temperatures outside the above range may not be preferred.

In the thermal decomposition of perhydropolysilazane into TSA, the thermal decomposition temperature can be reduced by using a metal catalyst. The metal catalyst preferably includes an aluminum compound.

TSA thus obtained is a substance having a boiling point of 51° C. and it can be separated readily from perhydropolysilazane.

One of the specific examples of the preparation process of TSA by using a thermal decomposition reaction may comprise the following steps: (1) heating a perhydropolysilazane solution under reduced pressure or an inert gas stream to remove the solvent therefrom, (2) after or simultaneously removing of the solvent, thermally decomposing perhydropolysilazane by heating under reduced pressure or in the inert gas stream, and (3) distilling the product obtained in the step (2). The process may further comprise, between the steps (2) and (3), a step of cooling the product obtained in the step (2) for condensation thereof.

In the thermal decomposition step, the decomposition reaction can take place by introducing an organic solvent solution of perhydropolysilazane in a reaction container purged with the inert gas and heating the solution at the decomposition temperature while or after distilling off the organic solvent. Perhydropolysilazane thermally decomposes to yield TSA when heated to the thermal decomposition temperature (300° C. or higher, in absence of catalyst). In the thermal decomposition reaction to TSA at that temperature, a trace amount of silane, ammonia, cyclotrisilazane and the like may be generated as byproducts. A small amount of byproducts may also be generated after the organic solvent is distilled off and until the temperature arrives at the temperature of the thermal decomposition to TSA. These byproducts have a boiling point widely different from that of TSA, which facilitates separation and purification of TSA from these byproducts. In addition, the thermal decomposition product mixture obtained from the reaction in the above temperature range contains almost no residue so that the thermal decomposition reaction can be carried out in a continuous manner or a batch manner.

When the thermal decomposition reaction is performed in a continuous manner, the inert gas may be introduced in a reactor of a reaction apparatus and the organic solvent solution of perhydropolysilazane may be added dropwise to the reaction apparatus whose surface temperature has been controlled so as to be the thermal decomposition reaction temperature.

Examples of the reaction apparatus include a glass tube covered at the outer circumference thereof with a heating element, a lamp heating apparatus for heating a predetermined region through infrared irradiation, and an apparatus for heating a specific metal to a curie temperature through high-frequency irradiation.

By the dropwise addition of the perhydropolysilazane solution to the reaction apparatus so that surface temperature of the apparatus falls within the above thermal decomposition temperature range, the solvent is distilled off and at the same time, the thermal decomposition reaction occurs to generate TSA.

TSA thus generated by the thermal decomposition reaction in the reaction step can be isolated by distillation and purification. In order to obtain TSA having a higher purity, it is preferred to send a TSA-containing gas generated in a continuous reaction step from the reactor to a cooler to cool and liquefy it, and then distill it. In this operation, the temperature at a cooling part of the cooler is controlled preferably to 0° C. or less, more preferably −20° C. or less, which enables recovery of TSA as completely as possible.

Moreover, by distilling the thermal decomposition reaction product containing TSA, which has been liquefied and recovered, TSA having a boiling point of 51° C. can be recovered as a purified substance.

When TSA is obtained through a batch reaction, on the other hand, it is possible to employ, for example, the following process. Described specifically, TSA can be obtained by introducing the inert gas in a reactor in the same manner as in the continuous reaction, charging the organic solvent solution of perhydropolysilazane in the reaction container, heating it to distill off most of the solvent, and then increasing the temperature of the reaction container to the thermal decomposition temperature range.

Alternatively, TSA can also be obtained by inserting a boat enclosing therein the perhydropolysilazane solution, instead of adding dropwise the perhydropolysilazane solution, to a reaction region kept at a temperature causing the decomposition reaction.

In order to obtain TSA in the form of gas being generated from the reaction container and having lower content of an organic solvent, it is possible to employ a process comprising the steps of introducing, into a predetermined region, a perhydropolysilazane film obtained by evaporating the solvent in advance with preliminary heating and then heating the film.

As in the continuous reaction, TSA thus generated can be recovered by being cooled. In the batch reaction, the organic solvent may also be separately recovered in advance to provide a mixture having a high TSA concentration after recovery from a thermal decomposition product. Separate recovery of the organic solvent can be performed in a known manner at an appropriate temperature, depending on the kind of the organic solvent. Also, purified TSA can be obtained finally by distillation in the same manner as in the continuous reaction.

Almost no residue remains after the thermal decomposition reaction so that it is possible to reduce the temperature of the reaction container once after completion of the first reaction and then introduce perhydropolysilazane, which is a precursor, again to carry out the next reaction.

Incidentally, the thermal decomposition temperature can be reduced by using a metal catalyst in the thermal decomposition reaction.

The preparation process of TSA according to the present invention enables preparation of TSA at a yield of from 20 to 90%. When a perhydropolysilazane solution is used, a large difference in boiling point between the solvent and TSA allows the preparation of high-purity TSA.

EXAMPLES

The present invention will hereinafter be described specifically by Examples. However, it should not be construed that the preparation process of TSA according to the present invention is limited by these Examples.

In the following Examples, a thermal reaction was performed using "Curie Point Pyrolyzer JHP-22", manufactured by Japan Analytical Industry; the product was analyzed using gas chromatography apparatus, "GC-17A", manufactured by Shimadzu Corporation; and the product was identified using a GC-MS apparatus, "GCMS-QP5050A", manufactured by Shimadzu Corporation. As perhydropolysilazane, "AQUAMICA NN110" (20 wt % xylene solution), manufactured by Clariant was used.

Examples 1 to 16

Comparative Examples 1 and 2

After 5 mg of a 20 wt % xylene solution of perhydropolysilazane was charged in each aluminum cup wrapped with a pyrofoil and heated in an inert gas atmosphere (He gas or hydrogen gas) to evaporate xylene, the cup was set in the curie point pyrolyzer and heated to 590° C., 500° C., 485° C., 445° C., 423° C., 386° C., 358° C., 333° C., or 280° C. by application of high frequency for 15 seconds. The thermal decomposition product thus obtained was subjected to the GC-MS analysis and identified by comparing its mass spectrum with that of a standard substance. Helium or hydrogen was used as an atmosphere for the thermal decomposition. In Table 1, "Produced" shows that production of TSA was confirmed, while "Failed" shows that production of TSA was not confirmed. Incidentally, in "Failed", perhydropolysilazane remained in the aluminum cup after the heating, while in "Produced" nothing remained in the aluminum cup.

TABLE 1

| | Thermal decomposition temperature (° C.) | Atmospheric gas | TSA Production |
|---|---|---|---|
| Example 1 | 590 | He | Produced |
| Example 2 | 590 | $H_2$ | Produced |
| Example 3 | 500 | He | Produced |
| Example 4 | 500 | $H_2$ | Produced |
| Example 5 | 485 | He | Produced |
| Example 6 | 485 | $H_2$ | Produced |
| Example 7 | 445 | He | Produced |
| Example 8 | 445 | $H_2$ | Produced |
| Example 9 | 423 | He | Produced |
| Example 10 | 423 | $H_2$ | Produced |
| Example 11 | 386 | He | Produced |
| Example 12 | 386 | $H_2$ | Produced |
| Example 13 | 358 | He | Produced |
| Example 14 | 358 | $H_2$ | Produced |
| Example 15 | 333 | He | Produced |
| Example 16 | 333 | $H_2$ | Produced |
| Comparative Example 1 | 280 | He | Failed |

TABLE 1-continued

| | Thermal decomposition temperature (° C.) | Atmospheric gas | TSA Production |
|---|---|---|---|
| Comparative Example 2 | 280 | $H_2$ | Failed |

Example 17

A two-necked flask was connected to a glass vacuum line comprising an exhaust system with a gas treatment equipment (for silazane gas). It was charged with 30 g of a 20 wt % xylene solution of perhydropolysilazane. Xylene was then evaporated for removal by reducing the pressure to 0.1 atm to yield a perhydropolysilazane film. The pressure was then returned to normal pressure of 1.0 atm by feeding an argon stream. The two-necked flask was gradually heated to increase its wall temperature to 400° C. under the argon stream and the temperature was kept at 400° C. for 30 minutes. The gas generated from the thermal decomposition was introduced from the flask into a trap cooled to −78° C. with dry ice/methanol, condensed and recovered. Then, the mixture thus recovered was gradually warmed to room temperature. By gradual heating and distillation, 3.8 g of TSA was obtained as a fraction at from 50 to 51° C. The TSA thus obtained had a purity of 99.8% and the yield was 63%.

The invention claimed is:

1. A process of preparing trisilylamine, the process comprising the steps of:
    subjecting perhydropolysilazane to a temperature of 300 to 600° C. to thermally decompose perhydropolysilazane to generate trisilylamine gas under an oxygen-free or low oxygen atmosphere; and
    cooling the trisilylamine gas for liquefaction.

2. The process of preparing trisilylamine according to claim 1, wherein the oxygen-free or low oxygen atmosphere is an atmosphere of a gas inert to perhydropolysilazane and trisilylamine or at reduced pressure.

3. The process of preparing trisilylamine according to claim 2, wherein the inert gas contains at least one gas selected from the group consisting of a hydrogen gas and noble gases.

4. The process of preparing trisilylamine according to claim 1, wherein the perhydropolysilazane is a solution of perhydropolysilazane in an organic solvent.

* * * * *